2,314,110

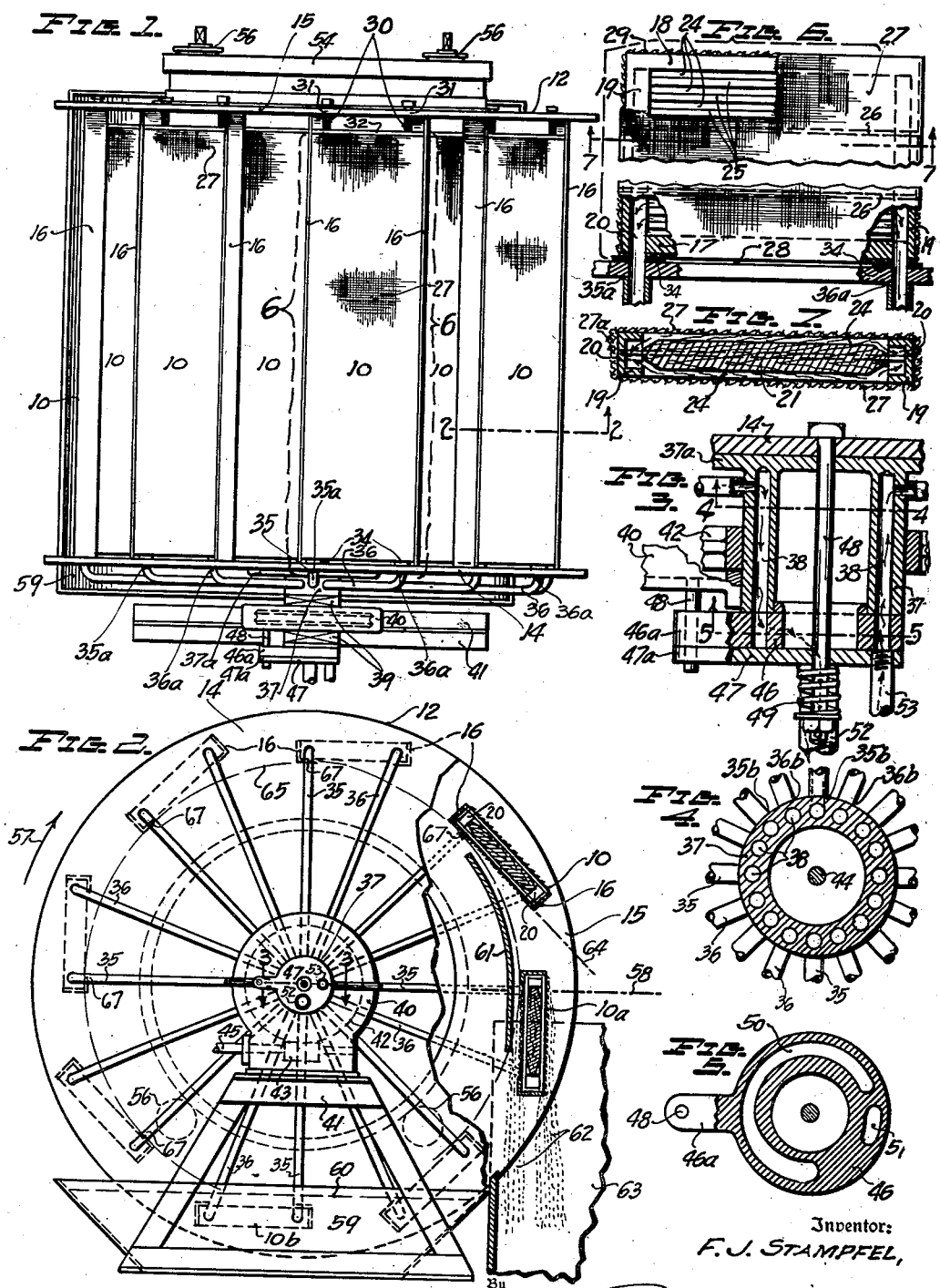
March 16, 1943. F. J. STAMPFEL 2,314,110
CONTINUOUS VACUUM FILTER
Filed May 26, 1939
Inventor:
F. J. Stampfel,
Attorney Patented Mar. 16, 1943

UNITED STATES PATENT OFFICE 2,314,110

CONTINUOUS VACUUM FILTER

Frank J. Stampfel, Midvale, Utah

Application May 26, 1939, Serial No. 275,945

6 Claims. (Cl. 210—200)

This invention relates to a continuous vacuum filter, and more particularly to one of the revolving type.

The principal objects of the invention are:

First.—To provide a high degree of filtering capacity.

Second.—To divide the total filtering area into a plurality of quickly removable elements or units.

Third.—To make each element a self-contained vacuum filter unit independent of every other unit, in other words, a separate entity, one in which the filtering medium such as a filter cloth, can be removed and renewed without disturbing any of the other units.

Fourth.—To provide simplicity and accessibility for all operative parts.

Fifth.—To discharge the filter cake in a restricted vertical path substantially tangent to the surface of revolution generated by that filter surface nearest the axis of revolution, thereby facilitating the free downward flow of the discharged filter cake.

Sixth.—To so position the filter units in the revolving structure, relative to one another and to the direction of revolution, that the plane of each successive inside filter surface produced, that is to say, the one nearest the axis of revolution, clears completely every part of the next preceding filter unit, thereby preventing impedance of flow of the discharged filter cake from the unit in question, by the said next preceding unit.

In the drawing,

Fig. 1 represents a plan;

Fig. 2, an end elevation, partly in section, taken on line 2—2 in Fig. 1;

Fig. 3, a fragmentary section taken on the line 3—3 Fig. 2, drawn to a scale considerably enlarged;

Figs. 4 and 5, sections taken respectively on the lines 4—4 and 5—5 in Fig. 3;

Fig. 6, a plan, partly in section and parts broken away, of an individual filtering unit, such as the one indicated at 6 in Fig. 1, this figure being drawn to an enlarged scale; and Fig. 7, a section taken on the line 7—7 in Fig. 6.

Referring to the drawing, the improved individual filtering element or unit is indicated by the numeral 10. A plurality of such units is spaced around the axis of a revolving structure 12, which in this instance, advantageously comprises an end head or disk 14 and an oppositely disposed end-head ring 15 between the two of which the filtering units 10 are operatively disposed. Each filtering unit advantageously rests between two distance pieces 16 consisting in this instance of a pair of metal angles extending between the heads 14 and 15, and connected thereto in any suitable manner, for example, by welding. The filter units may be constructed in various ways, one way being to provide a frame consisting of the end portions 17 and 18, which are integrally connected to each other by the channeled side portions 19. The latter advantageously define passages 20 at least partially, along the length of the frame.

Fitted within each frame is an insert 21 which may be made of wood or other suitable material, the insert being grooved across the face thereof in any suitable manner, for example as indicated at 24, for the purpose of conducting filtrate into the channels 20. The grooves naturally produce ridges 25, the tops of which may be substantially flush with the top and bottom faces of the frame. The insert 21 is preferably fitted snugly into the frame, and in addition, may be secured therein by means of rods 26 extending across the frame. Each frame and its insert, before being put in place in the revolving structure, is wrapped around with a filter medium, for example a cloth 27, the cloth being advantageously lapped along a side face of the frame as indicated at 27a, Fig. 7.

Supposing the revolving structure with its angles 16 to be assembled ready to receive the filtering units, the latter are put in place as indicated at 6 in Fig. 1, the unit being clamped in place by any suitable means, for example, screws 30 threaded at 31, in the head 15. An end strip 32 advantageously bears against the unit and takes the reaction of the clamping screws. At the opposite end of the filtering unit may be gaskets 34 which are clamped between the unit and the head 14 when the screws 30 are tightened.

Air pipes 35 and 36 extend from each filtering unit alongside the disk 14 to the hub 37. These pipes provide air-tight communication between the respective channels 20 and corresponding passages 38, the latter advantageously extending substantially parallel to the axis of the hollow hub 37 and concentric therewith. The pipes 35 and 36 may be welded to the end head 14 at 35a and 36a respectively, and to the hollow hub at 35b and 36b respectively. The gaskets 34 make airtight connections between the passages 20 and the respective air pipes 35 and 36. Advantageously, each filter unit 10 may be finished off by turning and folding in both ends of the filter cloth as indicated at 28 and 29 in Fig. 6.

The hub 37 through flange 37a may be fast on the disk 14 and may be journaled in bearings 39 forming part of a worm gear casing, the latter being supported on a stand 41. A worm wheel 42, fast on the hub, is engaged by a worm 43 which in turn is fast on a shaft 45, the latter receiving power from an electric motor (not shown) or other suitable power means.

A ported ring 46 having the arm 46a, is in airtight running contact with the end face of the hub 37 and in turn is covered airtight by a disk 47. The disk has an arm 47a, corresponding to the arm 46a, and both arms may be held stationary by any suitable means such as a pin 48 fast in the casing 40.

A bolt 44 advantageously extends through the head 14 and through the disk 47, and by means of a compression spring 49 holds the assembly together airtight.

A port 50 in the ring 46 is suitably disposed so as to allow air to be exhausted from certain of the filter units through respective ones of the pipes 35 and 36. At the same time, another port 51 allows compressed air to be injected into certain others of the filter units. The port 50 is advantageously connected to a suction device such as a so-called vacuum pump (not shown) through a conduit or pipe 52, while the port 51 is connected with a source of compressed air (not shown) through a conduit or pipe 53. Both the suction means and the compressed air means act upon the filter units in much the usual manner and as shall presently be described.

The ring head 15 may carry a tire 54 disposed to revolve on trunnions 55, for supporting the other end of the revolving structure.

The filtering units 10 are advantageously disposed and spaced apart from one another edge to edge in the revolving structure so that, considering the revolving motion to be in the direction of the arrow 57, Fig. 2, each unit, for the purpose of discharging its filter cake receives an injection of compressed air while it is in or near a substantially vertical position, and advantageously at or below a horizontal axial plane 58, indicated in Fig. 2.

Shortly after its filter cake is discharged, each successive filter unit enters the material to be filtered, this material being confined in a container such as a tank 59 and having approximately the level 60. Advantageously, suction begins just before a unit reaches the horizontal position in the tank, and continues until just before the cake-discharge position 19a, Fig. 2, is reached, amounting as a rule to an approximate maximum of 270 angular degrees, as exemplified by the port 50, Fig. 5. The duration of both the filtering and the discharge periods in angular degrees may be predetermined by varying the relative extents of the ports 50 and 51 respectively.

A deflector at 61 aids in guiding the discharging filter cake 62 into a bin 63, or in any other suitable receptacle, the deflector being supported as desired.

A remarkable advantage is secured in the formation of the filter cake because of the double-faced feature in the filtering units, and because of the horizontal disposition of the filter surfaces of a unit as indicated at 10b, Fig. 2 when taking on the filter cake. Here the very fine solid matter which is colloidal in character, naturally collects and remains in suspension in the upper portion of a solution, and is readily deposited on the upper surface of the filter unit, while the coarse matter which naturally collects in the lower portion of the solution is simultaneously subjected to an intensive filtering action along the lower filter surface of the same unit. It is to be particularly observed that substantially no part of any one of the successive filtering units overlaps an adjacent filtering unit, since, otherwise, the proper deposition of fine material and the proper suction on the coarse material would be largely prevented.

The disposition of the filter units in the revolving structure is such that the plane of each inner filter surface, when produced in the direction of revolution, as exemplified at 64, Fig. 2, intersects no part of the next preceding unit. This advantageous arrangement of the filter units makes possible the free and unimpeded discharge, as indicated at 62 aforesaid, of the filter cake. The arrangement is further characterized by the fact that the filter cake is advantageously discharged at a time when the filter surfaces are at or nearly at the vertical position and largely below the horizontal plane 58, as aforesaid. By this means the discharging filter cake falls substantially within the restricted vertical path 62, which is approximately tangent to a surface of revolution 65 generated by elements such as those indicated at 67, along which elements, the filter surfaces are tangent to the revolutionary surface 65. By changing the ports 50 and 51, the filtering extent and the discharge of filter cake can be regulated as desired.

The filter units are also so disposed in the revolvable structure that the respective planes in which they lie are wholly spaced apart from and extend substantially parallel with the axis of revolution of the revolvable structure, whereby broad faces of the filter units are directed toward the axis of revolution and extend substantially longitudinally with the length thereof.

Frequently, when coarse material is to be filtered, the structure 12 is advantageously revolved counter to the arrow 57, with the result that the material is picked up at approximately 10b, and is carried upward only the relatively short distance to 19a, before being discharged. Naturally this lessens the filtering period, an advantage in handling coarse material. Also, it prevents any considerable percentage of coarse material from sliding off and dropping back into the tank, this being possible when a filter unit passes through the longer travel from pick-up to discharge. Obviously, when the stated reversal of revolution is resorted to, the ports in the ring 46 must be changed accordingly.

In the stated arrangement, the filter units during the pick-up period are submerged in single-story relation and substantially level in the material to be filtered, at a low point of revolution. Each unit may have a relatively long periodic filtering action in one direction of revolution or a relatively short periodic filtering action if and when revolving in the counterdirection.

Having fully described my invention, what I claim is:

1. A continuous vacuum filter, including in combination, a revolvable structure having an axis of revolution; a plurality of independent, self-contained, substantially rectangular filter units supported by the revolvable structure and spaced apart from one another, substantially edge-to-edge, around the said axis of revolution so that substantially no part of any one filter unit overlaps an adjacent filter unit, the said filter units lying in respective planes which are wholly spaced apart from and extend longitudinally with the said axis of revolution, whereby broad faces of said filter units are directed toward said axis of revolution and extend longitudinally therewith, each of the said filter units comprising a hollow, at least partially walled body having two filter faces opposite to, and closely spaced apart from, each other; suction means operative to draw moisture through the said filter faces during certain angular degrees of revolution; and compressed fluid means operative to discharge filter cake from the filter surfaces during a period of revolution when the filter surfaces are approximately vertical.

2. A continuous vacuum filter in accordance with claim 1, wherein the certain angular degrees are approximately two hundred and seventy in number.

3. A continuous vacuum filter comprising a plurality of double-faced filter units, which are substantially rectangular in cross-section and revolvably disposed around, substantially parallel to, an axis of revolution, the individual filter units being spaced apart from one another substantially edge-to-edge around said axis of revolution so that substantially no part of any one filter unit overlaps an adjacent filter unit, the said filter units lying in respective planes which are wholly spaced apart from the said axis of revolution, whereby broad faces of said filter units are directed toward said axis of revolution and extend substantially longitudinally with the length thereof so that said filter units successively dip in single-story relation into and pass through material to be filtered, each filter unit having its two broad filter surfaces disposed in direct opposition, and relatively close, to each other; a container for material to be filtered; suction means operative to draw moisture through the said filter surfaces beginning at a point where the filter surfaces are nearly horizontal within the said container, the suction being continued during a certain period of revolution; and compressed-fluid means operative to inject compressed fluid into successive filter units as they respectively pass through a period of revolution during which the filter surfaces thereof are approximately vertical.

4. A continuous vacuum filter, including in combination, a revolvable structure having an axis of revolution, a plurality of filter units spaced apart from one another edge to edge and without any overlap, around, and substantially parallel to, the axis of revolution, each filter unit comprising a substantially rectangular frame having inwardly channeled side portions at least partially defining conduits for filtrate; a grooved insert within the frame, the grooves of which are in communication with the said channels; a filter medium enclosing the frame with its insert, suction means operative to draw moisture through the filter medium, through the grooves and through the channels to a point of disposal, during the period that the filter unit is passing through a predetermined arc, and compressed fluid means operative to inject compressed air into the said channels, and through the said grooves through the said filter medium, for the purpose of discharging filter cake during another predetermined arc of revolution.

5. A continuous vacuum filter, including in combination; a plurality of individual filter units; and a revolvable structure upon which said filter units are mounted, said revolvable structure having an axis of revolution, and said filter units being substantially rectangular in cross-section and spaced apart from one another substantially edge-to-edge around the said axis of revolution so that substantially no part of any one filter unit overlaps an adjacent filter unit, the said filter units lying in respective planes which are wholly spaced apart from and which extend longitudinally with the said axis of revolution, whereby broad faces of said filter units are directed toward said axis of revolution and extend longitudinally therewith.

6. A continuous vacuum filter including in combination, a structure revolvable in a given direction or counter to the said direction; a plurality of individual filter units which are rectangular in cross-section and spaced apart from one another substantially edge-to-edge around the axis of revolution of said revolvable structure so that substantially no part of any one filter unit overlaps an adjacent filter unit, the said filter units lying in respective planes which are wholly spaced apart from and which extend longitudinally with the said axis of revolution, whereby broad faces of said filter units are directed toward said axis of revolution and extend longitudinally therewith; a container for material to be filtered, in which the filter units are successively submerged substantially level in single-story relation at a low point of revolution, the filter units being disposed to discharge filter cake in a position where each successive filter unit is substantially vertical and located largely below the horizontal axial plane; means operative to discharge the filter cake; and means operative to exert a relatively long periodic filtering action upon the filter units while the latter are moving in the given direction, or a relatively short periodic filtering action if and when the said filter units are moving in the counterdirection.

FRANK J. STAMPFEL.